(12) United States Patent
Khan

(10) Patent No.: US 7,831,266 B1
(45) Date of Patent: Nov. 9, 2010

(54) METHOD AND SYSTEM FOR ROUTING A PUSH-TO-TALK (PTT) CALL IN A COMMUNICATIONS NETWORK

(75) Inventor: Safwan Khan, Gainesville, VA (US)

(73) Assignee: Nextel Communications Inc., Reston, VA (US)

( * ) Notice: Subject to any disclaimer, the term of this patent is extended or adjusted under 35 U.S.C. 154(b) by 839 days.

(21) Appl. No.: 11/734,111

(22) Filed: Apr. 11, 2007

(51) Int. Cl.
*H04W 4/00* (2009.01)
(52) U.S. Cl. .................. 455/466; 455/445; 455/435.2
(58) Field of Classification Search .............. 455/466, 455/445, 435.2
See application file for complete search history.

(56) References Cited

U.S. PATENT DOCUMENTS

2005/0119017 A1* 6/2005 Lovell et al. ............. 455/466

* cited by examiner

*Primary Examiner*—Yuwen Pan

(57) ABSTRACT

A method and system for routing a push-to-talk (PTT) call in a communications network is disclosed. A PTT call request is received at a regional call processor of the communications network, where the PTT call request includes an address for a called party with a first user part and a second domain part. The regional call processor consults a table to determine whether the second domain part is associated with the communications network. The regional call processor routes the PTT call request to a central call processor of the communications network if the second domain part is associated with the communications network and routes the PTT call request to a gateway if the second domain part is not associated with the communications network.

17 Claims, 1 Drawing Sheet

METHOD AND SYSTEM FOR ROUTING A PUSH-TO-TALK (PTT) CALL IN A COMMUNICATIONS NETWORK

FIELD OF THE INVENTION

The present invention relates generally to the field of telecommunications, and in particular to routing of a push-to-talk (PTT) call in a communications network.

BACKGROUND OF THE INVENTION

Many different cellular service providers are now providing dispatch voice communication services. Dispatch communication services are commonly known as "walkie-talkie" types of calls, such as provided by Sprint Nextel Corporation, and identified by the trade names Push-To-Talk (PTT) or Direct Connect. With this increase in the number of service providers that are offering these services, there may be difficulties in routing dispatch calls to called parties.

Currently, in a QChat network as provided by Sprint Nextel and Qualcomm for providing dispatch communication services, for routing a dispatch call to a called party, a regional call processor receives a call request and must determine how to further route the call for processing. If the call is for a subscriber associated with the network, e.g., utilizing the technology of the QChat network, the regional call processor routes the call request to a central call processor. If the call is for a subscriber not associated with the network, e.g., for a subscriber associated with a network utilizing a different technology, the regional call processor routes the call to a gateway for routing to the other network.

When the regional call processor makes this determination as to whether to route the call to the central call processor or the gateway, the regional call processor does not contain a table of domains associated with the network. Therefore, inefficiencies may result when the regional call processor further routes the call. For example, if the call request is directed to a called party that is a Sprint Nextel subscriber serviced by the Integrated Digital Enhanced Network (iDEN), the called party's address will be an iDEN Universal Fleet Member ID (UFMI), e.g., 164*100*94. In this circumstance, the regional call processor will correctly route the call to the gateway. However, if the call is directed to a Sprint Nextel subscriber who has migrated from the iDEN technology to the QChat network for dispatch services, the called party's address will contain a user part and a domain part where the user part may be the subscriber's old UFMI number, e.g., UFMI@domain.com. In this circumstance, the regional call processor will dumb forward the call request to the gateway based on considering the UFMI part of the address and assuming, therefore, that the call request is for an iDEN subscriber. This can be inefficient if the call request was actually intended for a called party that is associated with the QChat network.

Therefore, it would be desirable to provide an improved method and system for routing a push-to-talk call in a communications network.

SUMMARY OF THE INVENTION

In accordance with an embodiment of a method and system of the present invention, a PTT call request is received at a regional call processor of the communications network, where the PTT call request includes an address for a called party with a first user part and a second domain part. The regional call processor consults a table to determine whether the second domain part is associated with the communications network. If the second domain part is associated with the communications network the PTT call request is routed to a central call processor of the communications network and if the second domain part is not associated with the communications network the PTT call request is routed to a gateway.

DETAILED DESCRIPTION OF THE EXEMPLARY EMBODIMENTS

Figure 1:
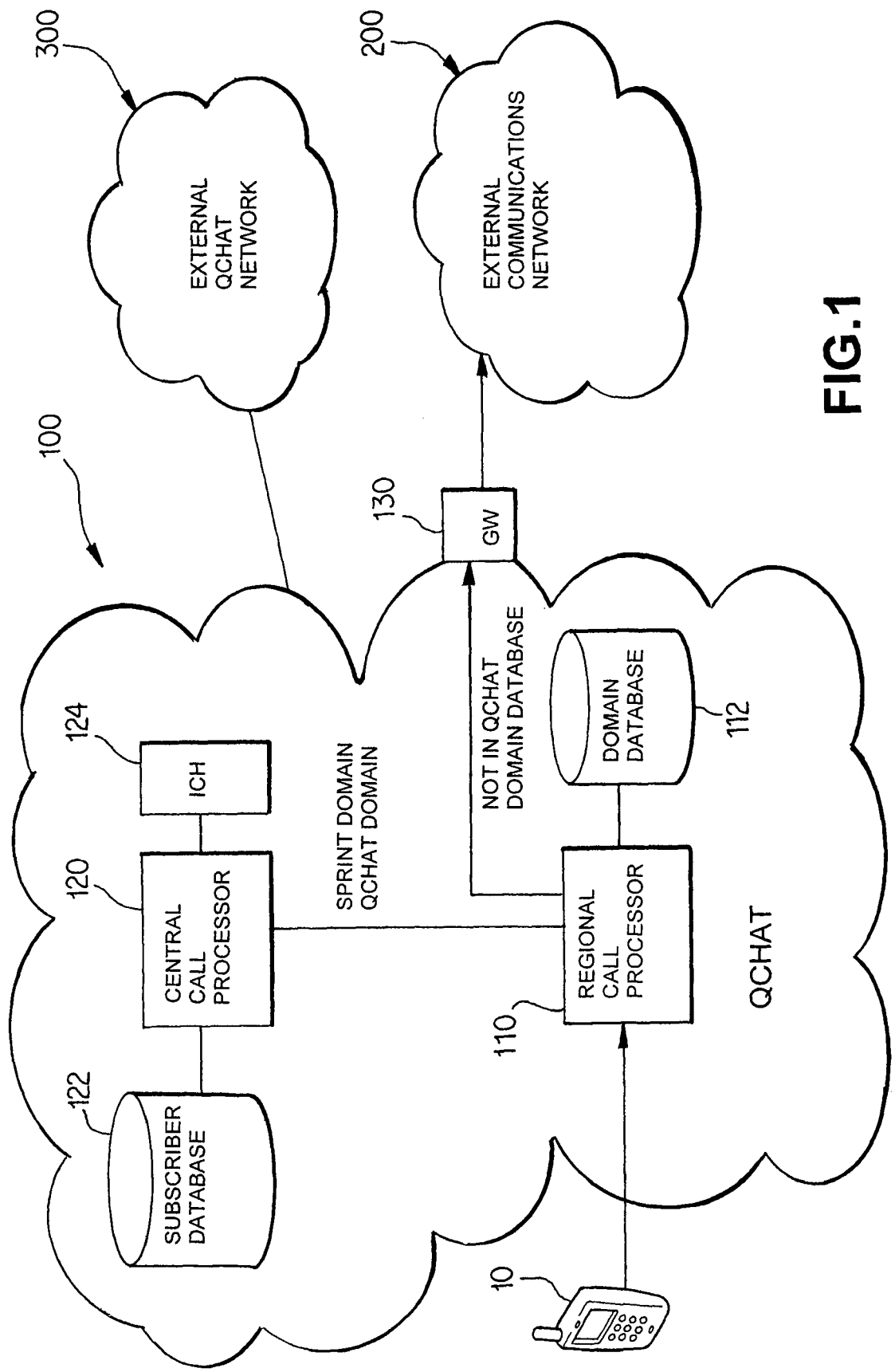
FIG. 1 illustrates an embodiment of a system and method for routing a push-to-talk call in a communications network in accordance with the principles of the present invention.

FIG. 1 illustrates an embodiment of an exemplary system for routing a push-to-talk call in a communications network in accordance with the principles of the present invention. In the exemplary embodiment, network 100 provides service for PTT calls and the network may be a QChat network, as provided by Sprint Nextel and Qualcomm. The QChat network utilizes the QChat Code Division Multiple Access (CDMA) technology. As is known, a PTT call is a half-duplex call.

Mobile communications device 10 desires to make a PTT call to a called party and sends a call request message to network 100. The call request message contains an address for the called party which includes a user part and a domain part, as discussed above. The called party may be associated with network 100 or an external communications network 200. In accordance with the principles of the present invention, network 100 will utilize the domain part of the called party's address for routing of the call request such that it ultimately reaches the called party.

When the call request is received at network 100, the request is received at regional call processor 110. The regional call processor is the first point of contact in the network to route the call correctly to the called party. Associated with regional call processor 110 is a domain database or table 112 that contains a listing of domains for which network 100 provides PTT calling services.

In an embodiment, when the call request is received at regional call processor 110, the regional call processor 110 looks at the domain part of the address. If the domain is a Sprint domain, and is thus associated with network 100, the regional call processor 110 routes the call to the central call processor 120 of the communications network for further routing. The central call processor 120 consults the subscriber database 122 that is coupled to the central call processor. The subscriber database 122 contains location information for the called party. After determining the location information for the called party, i.e., the subscriber with the Sprint domain portion of the address, the central call processor 120 routes the call to this called party. The central call processor 120 may utilize the user part of the called party's address for this further routing process.

If the domain part of the user address is not a Sprint domain, the regional call processor 110 will consult domain table 112 to determine if the domain is listed in the table. Domain table 112 contains a listing of QChat domains. If the domain part of the user address is listed in the domain table, the domain is a QChat domain and thus is associated with network 100. If the domain part of the user address is listed in the domain table, the regional call processor 110 routes the call request to the central call processor 120 for further routing of the call. Coupled to central call processor 120 is also an inter-carrier call handler (ICH) 124. The ICH will then further route the call to an external QChat system, e.g., external QChat network 300.

If the domain part of the user address is not listed in the domain table, the domain is not a QChat domain and thus is not associated with network 100. In this circumstance, the regional call processor 110 routes the call request to a gateway 130 that further forwards the request from network 100 to an external communications network 200. In an embodiment, the gateway is referred to as a QChat gateway that forwards the call from the QChat network to an external network that utilizes a different technology. For example, the unlisted domain may be associated with a push-to-talk over cellular (PoC) domain and the external network may be a PoC network. The gateway may convert the QChat signaling associated with the call request to SIP (Session Initiation Protocol) when sending the call request to the external network 200 for these inter-technology calls.

Thus, network 100 is generally a communications architecture that utilizes the QChat technology as provided by Qualcomm and may be generally referred to as a "QChat network" even though the architecture services various different domains as may be provided by various different carriers (networks) that utilize this technology for PTT calls, e.g., a Sprint domain in a Sprint network and various QChat domains in various other carrier networks, for example, QChat "external" network 300. The inter-carrier call handler routes calls from one carrier to other carriers within this umbrella of the QChat architecture. In an embodiment, the regional call processor is associated with the Sprint domain (network) and thus, the central call processor routes calls intended for the Sprint domain under the umbrella of the QChat architecture by consulting the subscriber database, and the central call processor routes calls for the QChat domains (networks) under the QChat architecture via the inter-carrier call handler. Of course, for calls outside of the umbrella of the QChat architecture, the calls are routed to the gateway by the regional call processor.

Whereas the domain table was described above as including QChat domains, the present invention is not limited to only including QChat domains in the table. The table may include QChat domains, the Sprint domain, and non-QChat domains. All that is required is that the regional call processor be able to consult the domain table to determine how to most-efficiently further route the call based on the address domain. In a circumstance where both QChat domains and non-QChat domains are listed in the table, if the regional call processor determines that the domain is a QChat domain by consulting the table the processor will forward the call to the central call processor, and if the regional call processor determines that the domain is a non-QChat domain by consulting the table the processor will forward the call to the gateway. If the regional call processor does not find the domain in the table, the call will be routed to the central call processor. If the central call processor cannot find the called party, the call request will not be further processed.

The disclosed embodiments are illustrative of the various ways in which the present invention may be practiced. Other embodiments can be implemented by those skilled in the art without departing from the spirit and scope of the present invention.

What is claimed is:

1. A method for routing a push-to-talk (PTT) call in a communications network, comprising the steps of:
   receiving a PTT call request at a regional call processor of the communications network, wherein the PTT call request includes an address for a called party with a first user part and a second domain part, wherein the second domain part is associated with the communications network and wherein the second domain part is of a QChat domain;
   consulting a table by the regional call processor to determine whether the second domain part is associated with the communications network; and
   routing the PTT call request to a central call processor of the communications network if the second domain part is associated with the communications network and routing the PTT call request to a gateway if the second domain part is not associated with the communications network, wherein the central call processor is coupled to an inter-carrier call handler and further comprising the step of routing the call request to the QChat domain by the inter-carrier call handler.

2. The method of claim 1, further comprising the step of determining a location for the called party by the central call processor by consulting a subscriber database associated with the central call processor.

3. The method of claim 1, wherein the first user part is a Universal Fleet Member ID (UFMI).

4. The method of claim 1, wherein the communications network is a QChat network.

5. A method for routing a push-to-talk (PTT) call in a communications network, comprising the steps of:
   receiving a PTT call request at a regional call processor of the communications network, wherein the PTT call request includes an address for a called party with a first user part and a second domain part;
   consulting a table by the regional call processor to determine whether the second domain part is associated with the communications network; and
   routing the PTT call request to a central call processor of the communications network if the second domain part is associated with the communications network and routing the PTT call request to a gateway if the second domain part is not associated with the communications network,
   wherein the table contains a list of QChat domains and wherein the second domain part is associated with the communications network if the second domain part is included in the list.

6. The method of claim 5, wherein the second domain part is associated with the communications network and wherein the second domain part is a QChat domain.

7. The method of claim 6, wherein the central call processor is coupled to an inter-carrier call handler and further comprising the step of routing the call request to the QChat domain by the inter-carrier call handler.

8. A method for routing a push-to-talk (PTT) call in a communications network, comprising the steps of:
   receiving a PTT call request at a regional call processor of the communications network, wherein the PTT call request includes an address for a called party with a first user part and a second domain part;
   consulting a table by the regional call processor to determine whether the second domain part is associated with the communications network; and
   routing the PTT call request to a central call processor of the communications network if the second domain part is associated with the communications network and routing the PTT call request to a gateway if the second domain part is not associated with the communications network,
   wherein the table contains a list of QChat domains and non-QChat domains and wherein the second domain part is not associated with the communications network if the second domain part is included in the list of non-QChat domains.

9. The method of claim 8, wherein the second domain part is associated with a push-to-talk over cellular (PoC) domain.

10. A system for routing a push-to-talk (PTT) call in a communications network, comprising:
- a regional call processor of the communications network, wherein the regional call processor receives a PTT call request and wherein the PTT call request includes an address for a called party with a first user part and a second domain part, wherein the second domain part is associated with the communications network and wherein the second domain part is of a QChat domain;
- a table coupled to the regional call processor, wherein the regional call processor consults the table to determine whether the second domain part is associated with the communications network;
- a central call processor and a gateway coupled to the regional call processor; and
- an inter-carrier call handler coupled to the central call processor,
- wherein the regional call processor routes the PTT call request to the central call processor if the second domain part is associated with the communications network and wherein the regional call processor routes the PTT call request to the gateway if the second domain part is not associated with the communications network, and wherein the inter-carrier call handler routes the call request to the QChat domain.

11. The system of claim 10, further comprising a subscriber database coupled to the central call processor wherein the central call processor determines a location for the called party by consulting the subscriber database.

12. The system of claim 10, wherein the first user part is a Universal Fleet Member ID (UFMI).

13. The system of claim 10, wherein the communications network is a QChat network.

14. The system of claim 10, wherein the table contains a list of QChat domains and wherein the second domain part is associated with the communications network if the second domain part is included in the list.

15. The system of claim 10, wherein the table contains a list of QChat domains and non-QChat domains.

16. The system of claim 10, wherein the gateway is coupled to a second communications network.

17. The system of claim 16, wherein the communications network utilizes a QChat technology and wherein the second communications network utilizes a technology different from the QChat technology.

* * * * *